United States Patent [19]

Kerr, Jr.

[11] Patent Number: 4,600,209

[45] Date of Patent: Jul. 15, 1986

[54] TRANSPORT SUPPORT FOR FREESTANDING UMBILICAL ACCESSORY

[76] Inventor: Robert L. Kerr, Jr., 6532 W. Palm La., Phoenix, Ariz. 85035

[21] Appl. No.: 626,716

[22] Filed: Jul. 2, 1984

[51] Int. Cl.[4] .......... B60D 1/00

[52] U.S. Cl. .......... 280/400; 5/503; 280/289 WC

[58] Field of Search .......... 280/400, 289 WC, 727; 297/DIG. 4; 248/227, 229; 5/507, 503, 508

[56] References Cited

U.S. PATENT DOCUMENTS

| | | | |
|---|---|---|---|
| 1,277,479 | 9/1918 | Ritchie | 248/229 |
| 1,546,332 | 7/1925 | Walters | 248/229 |
| 2,673,771 | 3/1954 | Krewson | 248/227 |
| 2,876,027 | 3/1959 | Sulmonetti | 248/229 X |
| 2,935,286 | 5/1960 | Parsons | 248/227 |
| 3,709,372 | 1/1973 | Alexander | 248/311.3 X |
| 4,121,798 | 10/1978 | Schumacher | 248/229 |
| 4,511,157 | 4/1985 | Wilt | 297/DIG. 4 |
| 4,511,158 | 4/1985 | Varga et al. | 297/DIG. 4 |

*Primary Examiner*—John A. Pekar
*Attorney, Agent, or Firm*—Charles P. Padgett, Jr.

[57] ABSTRACT

A transport support for securing a free standing transportable accessory having a high center of gravity such as a portable IV stand to a transporting vehicle having a relatively low center of gravity such as a wheeled gurney or wheelchair. The transport support comprises a first member secured to the transporting vehicle and a matingly indentical second member coupled to the transportable accessory, and releasable members for coupling the first and second members together. The releasable members including mating serrated washers for fixing a desired angular relationship between the vehicle and accessory.

16 Claims, 6 Drawing Figures

TRANSPORT SUPPORT FOR FREESTANDING UMBILICAL ACCESSORY

TECHNICAL FIELD

This invention relates generally to freestanding umbilical accessories and more specifically to a transport support which communicates stabilizing force to a freestanding umbilical accessory.

BACKGROUND ART

In the past, a freestanding accessory having a high center of gravity, when transported in conjunction with a transporting vehicle while necessarily connected by an umbilical hose or cable between the two, had a tendency to topple due to topheaviness while traversing floor discontinuities. Transport while umbilically conjoined, for example, occurs when a hospital patient, upon a wheeled gurney or in a wheelchair, is transported during continuous parenteral intravenous fluid infusion, connection to a freeestanding life support or bodily function monitoring apparatus or similar condition, wherein even momentary disconnection of the umbilical hose or cable might be health-threatening. Because the patient may be moved between a bed, transporting vehicle, surgical table and the like, the umbilically-connected accessory is usually freestanding. Intravenous dispensing bottles hung upon a pole for gravity dispensing tend to make the freestanding pole topheavy; stand-mounted heart monitors, breathing assistance apparatus and the like, are mounted relatively high upon their freestanding supports, for ready operator access and, like the intravenous dispensers, tend to be topheavy. Analogous non-medical examples include the umbilically-connected transport of two or more freestanding components of communication, audio-visual, video, printing, photocopying, computing, electrical, electronic, hydraulic, mechanical or pneumatic apparatus in home, office and industrial settings. Where motive power for such conjoined transport across an irregular floor surface is provided by a single person, it is especially difficult to prevent topheavy freestanding accessories from toppling.

A need existed for a transport support for a freestanding umbilical accessory which would communicate stabilizing force from a transporting vehicle having low center of gravity to an umbilically connected freestanding accessory having a high center of gravity, which transport support would be conveniently and releasably coupled between transporting vehicle and freestanding accessory, and which would accommodate a wide variety of shapes and sizes of coupling surfaces.

A further need existed for a transport support for a freestanding umbilical accessory which would, depending upon circumstances of transport, provide one or more independent directions of force communication fixing distance, angular displacement and vertical displacement between a freestanding umbilical accessory and a transporting vehicle.

A further need existed for a transport support for a freestanding umbilical accessory which would permit vertical displacement between a freestanding umbilical accessory and a transporting vehicle when traversing floor discontinuities, while simultaneously communicating the stabilizing force-resisting tendency of the freestanding accessory to topple.

It is an object of this invention to provide a transport support for a freestanding umbilical accessory.

It is a further object of this invention to provide a transport support for a freestanding umbilical accessory which communicates stabilizing force from a transporting vehicle having a low center of gravity to an umbilically-connected freestanding accessory having a high center of gravity.

Another object of this invention is to provide a transport support which may be conveniently and releasably coupled between transporting vehicle and freestanding accessory.

A further object of this invention is that a wide variety of sizes and shapes of coupling surfaces be accommodated.

Yet another object of this invention is to provide, depending upon circumstances of transport, one or more independent directions of stabilizing force communication fixing distance, angular displacement and vertical displacement between a freestanding umbilical accessory and a transporting vehicle.

Still another object of this invention is to permit vertical displacement between a freestanding umbilical accessory and a transporting vehicle when traversing floor discontinuities, while providing simultaneous communication the stabilizing force-resisting tendency of the freestanding accessory to topple.

DISCLOSURE OF INVENTION

In accordance with one embodiment of this invention, a transport support for freestanding umbilical accessory comprises a first member coupled to a transporting vehicle, a second member coupled to a freestanding umbilical accessory, and a releasable coupling between said first and second members disposed so as to communicate stabilizing force from said transport vehicle to said freestanding umbilical accessory.

Resistance to toppling of a high center-of-gravity, topheavy, freestanding umbilical accessory results from fixation, depending upon conditions of transport, in at least one embodiment of the invention or at the option of the user, of the distance, angular displacement and vertical displacement between said freestanding umbilical accessory and said transporting vehicle. Stated in another way, the center of gravity resulting from said coupling is lower and more stably disposed than the center of gravity of said freestanding umbilical accessory alone;

Fixing of distance between said members is provided by a releasable threaded fastener extending through both said first member and said second member. Fixing of angular displacement is provided by a first serrated washer affixed to said first member, matingly engaged with a second serrated washer affixed to said second member by means of compressive force exerted by said releasable threaded fastener extending therethrough. A releasable coupling between said second member and a coupling surface of said freestanding umbilical accessory in one embodiment fixes vertical displacement between said second member and said freestanding umbilical accessory, and comparable coupling is provided between said first member and a coupling surface of said transporting vehicle, fixing thereby the vertical displacement in an axis orthogonal to a generally horizontal plane therebetween. In an alternative embodiment, said second member is slideably coupled in an axis orthogonal to a generally horizontal plane, permitting vertical displacement to vary as the combination traverses floor discontinuities.

Means are disclosed for coupling said first member to a wide variety of sizes and shapes of coupling surfaces of said transporting vehicle, and for reducing abrasion thereof. Similar means are disclosed for coupling said second member to a wide variety of sizes and shapes of coupling surfaces of said freestanding umbilical accessory, and for reducing abrasion thereof. Coupling surface abrasion is reduced by interposing a layer of soft material. V-shaped or stepped coupling interfaces provide for clamping to cylindrical or odd-shaped portions of said transporting vehicle and of said freestanding umbilical accessory, and secured by one or more releasable clamps in one embodiment, and by hook-and-loop fasteners commonly sold under the trade name "VELCRO" TM in another embodiment.

Said releasable threaded fastener is disclosed in one embodiment as held captive in either said first or said second member, with threaded mate held captive in the corresponding member, to avoid loss or misplacement of said fasteners.

Uniform first members are disclosed coupled to a plurality of transporting vehicles, and uniform second members are disclosed coupled to a plurality of freestanding umbilical accessories permitting universal interchange of alternative freestanding umbilical accessories to alternative transporting vehicles.

In another embodiment, a plurality of serrated positioning washers and corresponding threaded captive fasteners are attached to at least one of said first member and said second member for provision of a variety of coupling locations and positions.

BRIEF DESCRIPTION OF THE DRAWINGS

In FIG. 6, one member is permanently affixed to the computer, while the second member is releasably affixed to the secretarial stand.

BEST MODES FOR CARRYING OUT THE INVENTION

Figure 1:
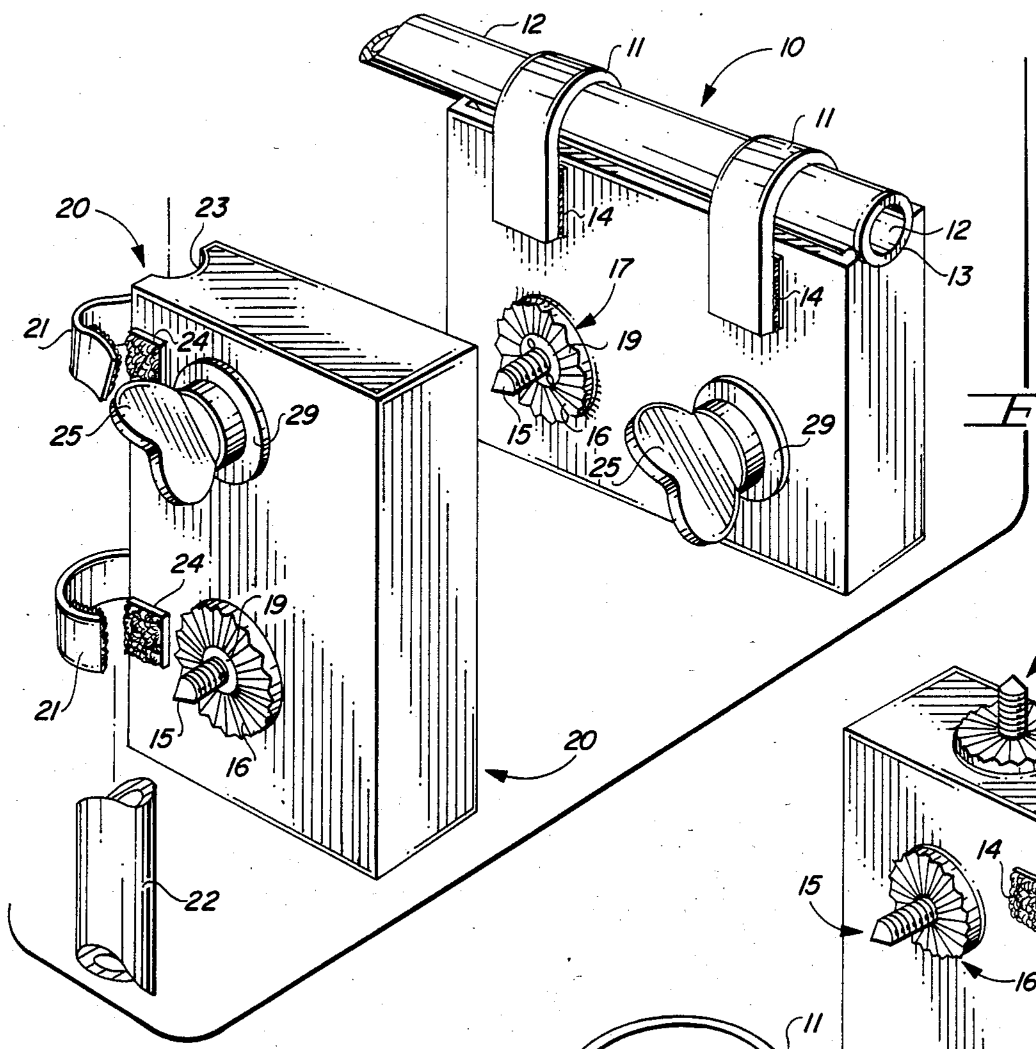
FIG. 1 is a persepctive view of two mating members of the transport support of the present invention for freestanding umbilical accessory showing attachment to orthogonally disposed tubular coupling elements of the respective transporting vehicle and of the freestanding umbilical accessory prior to coupling of the two members.

For the purpose of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

Referring to FIG. 1, a perspective view shows a first member generally referred to as reference number 10, and a second member generally referred to as 20. Hook-and-loop fasteners 11 and 14, of a type sold under the trade name "VELCRO" TM, attach a coupling surface of a transporting vehicle 12, shown as a cylindrical bar, to member 10 at semicircular recess 13. Captive threaded bolt 15 protrudes through serrated washer 16, which is firmly attached by welding, gluing or the like at interface surface 17 to member 10. Similarly describing member 20, hook-and-loop fasteners 21 and 24 attach a coupling surface of a freestanding umbilical accessory 22, shown as a cylindrical bar to member 20 at semicircular recess 23. Captive threaded wingnut 25 is positioned so as to receive the free end of captive threaded bolt 15 after said free end protrudes through serrated washer 26, which is firmly attached at interface surface 27 to member 20.

Figure 2:
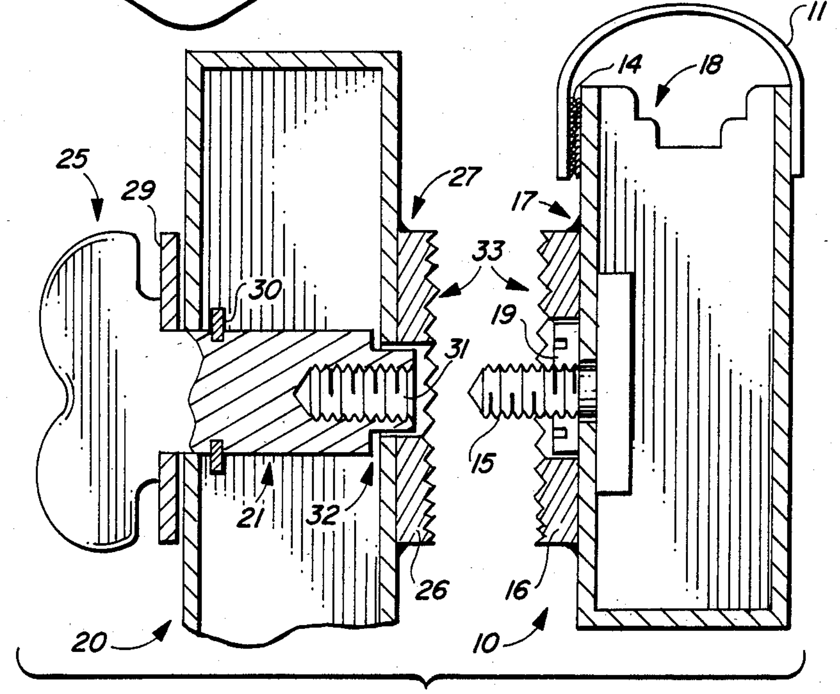
FIG. 2 is a front cross-sectional view of said two mating members, showing captive threaded mating attachment bolt and wingnut, mating serrated washers, hook-and-loop fastening means in open condition and stepped v-shaped receptacle for grasping contact surfaces on the respective transporting vehicle and freestanding umbilical accessory.

Referring to FIG. 2, a front cross-sectional view of members 10 and 20 prior to engagement shows bolt 15 protruding through serrated washer 16 which is affixed to member 10 at interface surface 17. Bolt 15 is held captive by recessed nut 19 and thereby prevented from rotating with respect to member 10. Wingnut 25 protrudes through member 20 to contact inner surface of member 20 at 32, opposite interface surface 27, and to apply compressive force at surface 32 when the external threads of bolt 15 are engaged with the internal threads 31 of wingnut 25. Washer 29 and retaining clip 30 hold wingnut 25 captive when not engaged with bolt 15. Although illustrated preparatory to orthogonal engagement of members 10 and 20, any angular displacement around the axis perpendicular to interface surface 27 may be selected by the user so long as the facial serrations 33 of washers 16 and 26 are aligned with each other. An alternative stepped v-type recess 18 is shown in FIG. 2, as compared with the semicircular recess 13, 23 of FIG. 1. Recess configuration 18 accommodates a wide variety of shapes and sizes of coupling surfaces of transporting vehicle 12 and freestanding umbilical accessory 22, and also provides toothed anti-rotation and anti-sliding engagement.

Figure 3:
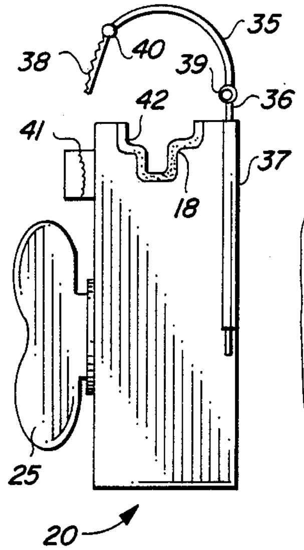
FIG. 3 is an end view of one of said members, showing a soft covering over the stepped v-shaped receptacle of FIG. 2 to resist abrasion, and showing an alternative strap-type means for fastening to coupling surface of the respective transporting vehicle and freestanding umbilical accessory.

Referring to FIG. 3, an alternative strap-type means is shown for fastening member 20 (shown) or member 10 (not shown) for coupling surfaces of transporting vehicle 12 or freestanding umbilical accessory (not shown) respectively. Pin 36 is retained in guide 37 and hinged at pivot 39 to strap 35. Ratchet 38 is hinged at pivot 40 to strap 35, and matingly engages releasable ratchet clasp 41. Also shown is a soft covering of a material such as split rubber edging, 42, provide an abrasion-resistant interface at recess 18.

Figure 4:
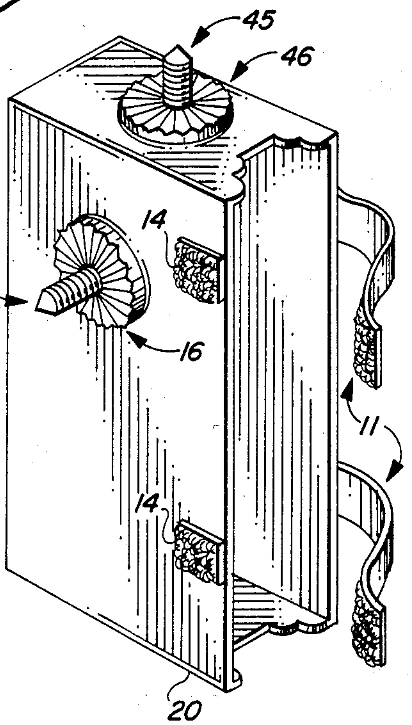
FIG. 4 is a perspective view of one of said members showing the alternative use and location of a plurality of serrated washers and respective captive threaded bolt.

Referring to FIG. 4, an alternative embodiment of member 20 to which are affixed a plurality of bolts 15, 45, and serrated washers 16, 46, allowing engagement on different axes.

Figure 5:
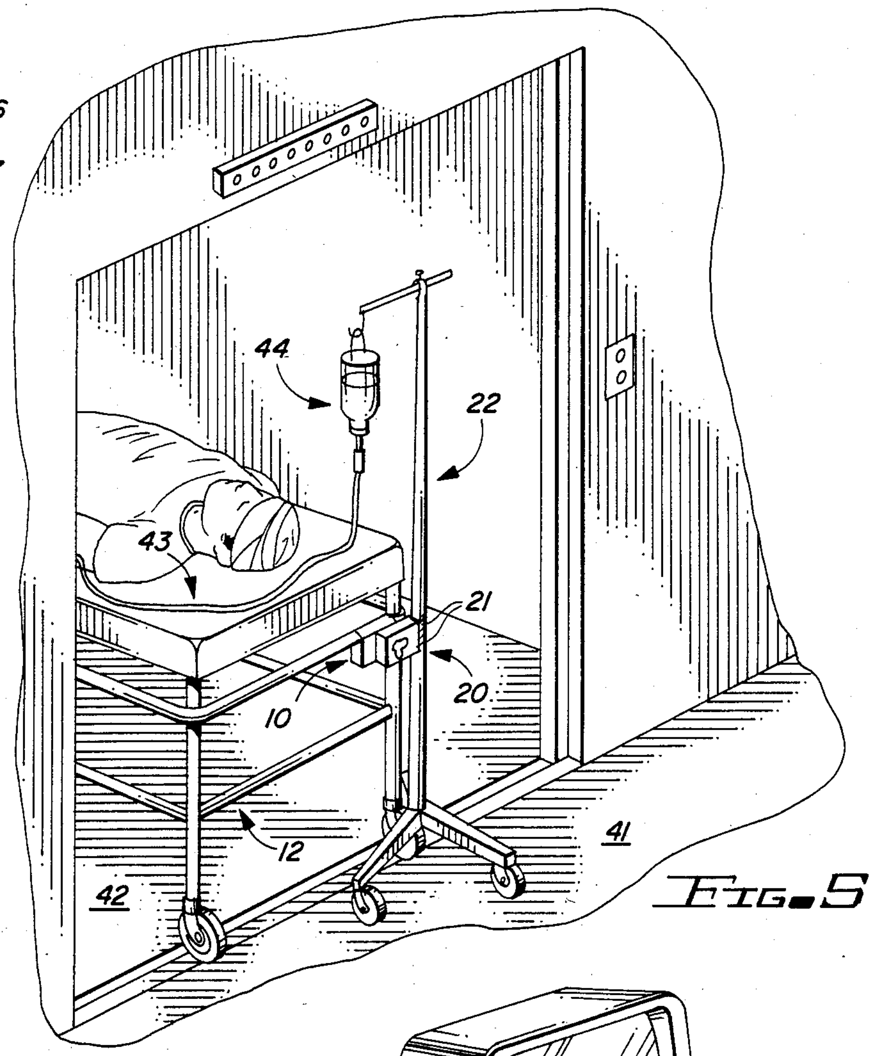
FIG. 5 illustrates a typical application of the transport support for freestanding umbilical accessory, in which a freestanding intravenous dispenser pole is coupled by means of the present invention to a patient-bearing wheeled gurney table upon which the patient is umbilically connected to the pole-borne intravenous bottle. The invention stabilizes the intravenous dispenser pole as it traverses the discontinuous step between a floor and an elevator.

Referring to FIG. 5, a typical application of the invention is illustrated, wherein a wheeled gurney transporting vehicle 12 is coupled by the invention, 10, 20 to a freestanding intravenous fluid dispener pole 22, umbilically connected from fluid dispensing bottle 44 through hose 43 to the patient borne upon gurney 12. As shown in FIG. 5, the combination 12, 22 is traversing the uneven juncture of floor 41 and elevator 42. Under the condition that hook-and-loop straps 21 are slightly loosened, accessory 22 can rise or fall slightly with respect to the elevation of gurney 12, while securely maintaining the angular displacement and distance between accessory 22 and gurney 12, thereby preventing accessory 22 from toppling.

Figure 6:
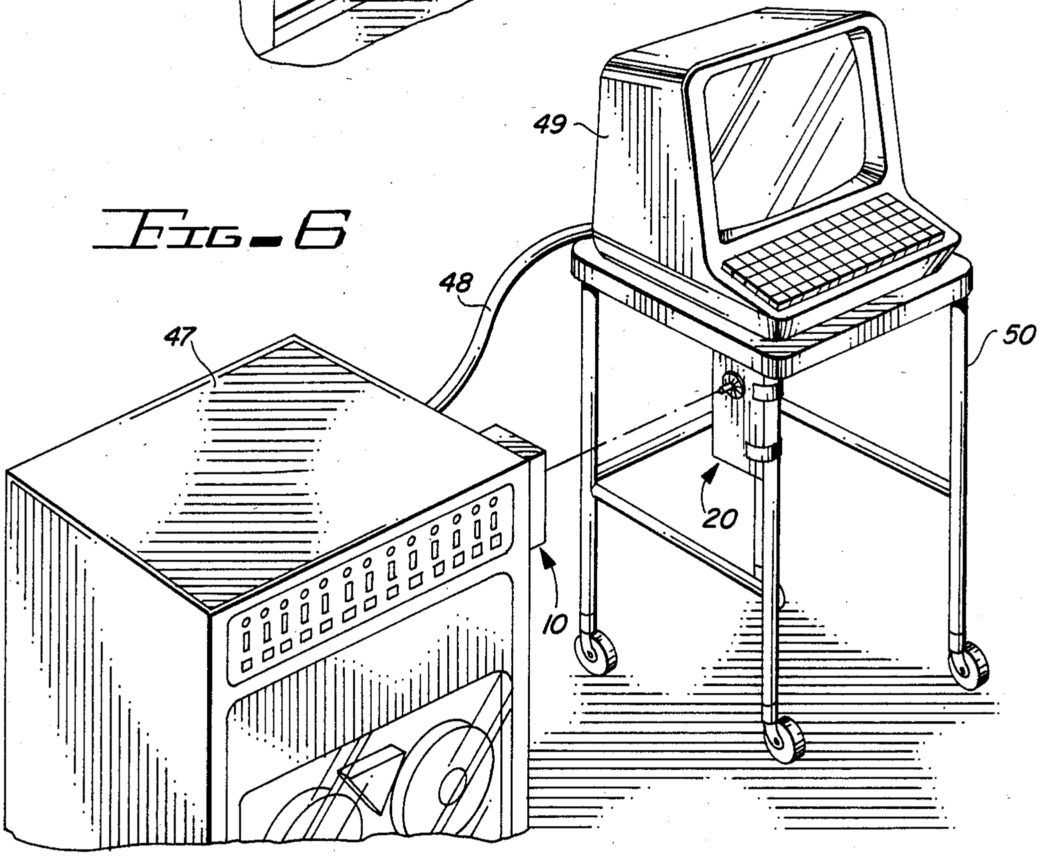
FIG. 6 is a persepctive view of the invention prior to coupling of a low center-of-gravity computer umbilically connected to an easily tippable rolling secretarial stand bearing a video display terminal.

Referring to FIG. 6, an office-type computer 47 having a low center of gravity is umbilically connected by cable 48 to video display terminal 49, which rests upon a tubular-construction, lightweight secretarial-type stand 50 susceptible because of topheaviness of toppling. Member 10 is shown permanently affixed by bolts, glue, welding or the like to computer 47; member 20 is affixed to a leg of secretarial stand 50 in a manner similar to that shown in FIG. 5.

While the invention has been particularly shown and described with reference to the preferred embodiments thereof, it will be understood by those skilled in the art that omissions and other changes in form and detail may be made therein without departing from the spirit and scope of the invention. While those skilled in the art will conceive other embodiments of the invention drawn from the teaching herein, it is intended that such other embodiments, so drawn, shall fall within the ambit of protection of the Claims appended hereto.

Having described my invention in the foregoing specification and drawings in such full detail that those skilled in the art may readily understand and practice the invention, that which I claim is:

1. A transport support for securing a freestanding transportable accessory having a relatively high center of gravity to a transporting vehicle having a relatively low center of gravity and wherein at least one of an umbilical hose and an umbilical cable communicates between said transporting vehicle and said freestanding transportable accessory, said transport support comprising:

- a first member coupled to said transporting vehicle;
- a second member coupled to said freestanding transportable accessory, said first member being matingly identical to said second member; and
- releasable means for coupling said first member to said second member such that a stabilizing force is communicated from said transporting vehicle to said freestanding transportable accessory to prevent tipping and the like.

2. The transport support of claim 1 wherein said releasable means for coupling said first member to said second member further includes means for fixing the distance between said transporting vehicle and said freestanding transportable accessory, said fixed distance being substantially equal to at least a portion of the combined dimensions of said first and second members.

3. The transport support of claim 2 wherein said means for selectively adjusting and fixing the angular displacement between said transporting vehicle and said freestanding transportable accessory, said angular displacement fixing means including a first serrated washer operably carried by said first member, a second oppositely positionable, mating serrated washer operably carried by said second member, said first and second serrated washers being rotatable with respect to each other to select a desired angular relationship and being matingly engaged in a fixed position with mutual serrations interlocked for fixing said angular displacement therebetween and means for securing said interlocked washers in the desired position.

4. The transport support of claim 3 wherein said first member includes a first longitudinal axis and said second member includes a second longitudinal axis and wherein said releasable means for operatively coupling said first member to said second member further comprises means for fixing the displacement in a direction orthogonal to a generally horizontal plane between said transporting vehicle and said freestanding transportable accessory, one of said first and second members being turned ninety degrees on its longitudinal axis with respect to the other of said first and second members, said first longitudinal axis being substantially orthogonal to said second longitudinal axis before said releasable means fixedly secures said members in said orthogonal configuration.

5. The transport support of claim 4 wherein one of said first and second members further comprises a first strap-like means for slidably coupling same to said freestanding transportable accessory in a direction generally orthogonal to a generally horizontal plane for releasably coupling said one of said first and second members to said accessory.

6. The transport support of claim 5 wherein the other of said first and second members further comprises a second strap-like means for releasably coupling the other of said first and second members to said freestanding transportable accessory.

7. The transport support claim 6 wherein at least one of said first and second strap-like coupling means further comprises strap means and an elongated arcuate channel disposed substantially along one side of said at least one of said first and second members for receiving a portion of at least one of said transportable accessory and said transport vehicle therein, said strap means for securing same within said channel.

8. The transport support of claim 7 wherein both of said members include said channels.

9. The transport support of claim 8 wherein said channel includes a layer of relatively soft material for preventing abrasions and the like.

10. The transport support of claim 3 wherein said means for fixing angular displacement between said transporting vehicle and said freestanding transportable accessory comprises:

- said first serrated positioning washer being affixed to said first member;
- said second serrated positioning washer being matingly affixed to second member; and
- captive threaded fastening means releasably coupled through said first serrated positioning washer and through said second serrated positioning washer for providing a coupling force between said first member and said second member, and for providing a compressive force between said first serrated positioning washer and said second serrated positioning washer for locking same at a selected angular displacement.

11. The transport support of claim 10 wherein a plurality of serrated positioning washers and captive threaded fastenings are attached to said first member and said second member for provision of a variety of coupling locations and positions.

12. The transport support of claim 3 wherein said transporting vehicle transports at least one person and wherein said freestanding transportable accessory provides at least one of a life support service, a dispenser for administration of fluid, a dispenser for administration of gas, a bodily function monitor, a bodily fluid propulsion apparatus, a bodily fluid purification apparatus, a bodily fluid reservoir, a breathing assistance apparatus, a communication apparatus and an alarm apparatus.

13. The transport support of claim 3 wherein said transporting vehicle transports at least one of communication apparatus, computer apparatus, recording apparatus, video processing apparatus, audio processing apparatus, electronic amplification apparatus, printing apparatus, photocopier, electronic apparatus, mechanical apparatus, hydraulic apparatus and pneumatic apparatus, and wherein said freestanding transportable accessory comprises at least one of communication input device, communication output device, computer input device, computer output device, computer peripheral, video display monitor, video camera, microphone, loudspeaker, power supply, paper collator, storage reservoir and other apparatus umbilically communicating with at least one of said apparatus transported by said transporting vehicle.

14. The transport support of claim 1 wherein a plurality of individual uniform first members are coupled to a corresponding plurality of individual transporting vehicles, and a plurality of individual, matingly uniform second members are coupled to a corresponding plurality of individual transportable accessory for facilitation of universal interchangeability between various transporting vehicles and various freestanding transportable accessory said uniform first and second members being substantially identical.

15. In a transport system wherein a transport vehicle having a relatively low center of gravity is used in conjunction with a freestanding transportable accessory and wherein at least one of said transporting vehicle and a person carried thereby is physically attached to said freestanding transportable accessory by umbilical means, an improved apparatus for selectively releasably securing said freestanding transportable accessory to said transporting vehicle for preventing said freestanding transportable accessory from tipping over ad the like, said improved apparatus comprising:

a first member including means for releasably securing same to at least a portion of said transporting vehicle;

a second member including means for releasably securing same to at least a portion of said freestanding transportable accessory said first and second members being substantially identical; and means carried by said first and second members for releasably securing said first and second members immovably together, (2) angularly positioning said freestanding transportable accessory with respect to said transporting vehicle, and (3) for producing a relatively immovable combination of said transporting vehicle and said transportable accessory which moves as a single integral unit such that said secured combination is a significantly lower center of gravity than did said freestanding transportable accessory alone thereby stabilizing said freestanding transportable accessory to prevent tipping and the like.

16. The improved transport system of claim 15 wherein said means for releasably securing said members to said transporting vehicles and said freestanding transportable accessory includes means carried by at least one side of each of said members for protecting the surface of said transporting vehicle and said freestanding transportable accessory for preventing any damage thereto.

* * * * *